United States Patent
Gu et al.

(10) Patent No.: US 12,493,112 B2
(45) Date of Patent: Dec. 9, 2025

(54) MULTIPLE-TARGET, SIMULTANEOUS BEAMFORMING FOR FOUR-DIMENSIONAL RADAR SYSTEMS

(71) Applicant: Aptiv Technologies AG, Schaffhausen (CH)

(72) Inventors: Yujie Gu, Calabasas, CA (US); Xin Zhang, Agoura Hills, CA (US); Zhengzheng Li, Agoura Hills, CA (US); Yu Zhang, Thousand Oaks, CA (US)

(73) Assignee: Aptiv Technologies AG, Schaffhausen (CH)

( * ) Notice: Subject to any disclaimer, the term of this patent is extended or adjusted under 35 U.S.C. 154(b) by 537 days.

(21) Appl. No.: 17/933,265

(22) Filed: Sep. 19, 2022

(65) Prior Publication Data
US 2024/0103151 A1    Mar. 28, 2024

(51) Int. Cl.
*G01S 13/42*    (2006.01)
*G01S 7/02*    (2006.01)
(Continued)

(52) U.S. Cl.
CPC .............. *G01S 13/42* (2013.01); *G01S 7/023* (2013.01); *G01S 13/931* (2013.01); *H01Q 1/3233* (2013.01); *G01S 2013/0245* (2013.01)

(58) Field of Classification Search
None
See application file for complete search history.

(56) References Cited

U.S. PATENT DOCUMENTS

| | | | |
|---|---|---|---|
| 5,657,027 | A | 8/1997 | Guymon |
| 7,474,262 | B2 | 1/2009 | Alland |
| (Continued) | | | |

FOREIGN PATENT DOCUMENTS

| | | |
|---|---|---|
| CN | 106772224 A | 5/2017 |
| CN | 111239678 A | 6/2020 |
| (Continued) | | |

OTHER PUBLICATIONS

"Extended European Search Report", EP Application No. 23165460.9, Sep. 15, 2023, 16 pages.

(Continued)

*Primary Examiner* — Whitney Moore
(74) *Attorney, Agent, or Firm* — Harness, Dickey & Pierce, P.L.C.

(57) ABSTRACT

This document describes techniques and systems of multiple-target, simultaneous beamforming for four-dimensional (4D) radar systems for efficient angle estimation in two dimensions with a high dynamic range. For example, a processor can use electromagnetic (EM) energy received by a two-dimensional (2D) array to determine first angles in a first dimension associated with one or more objects. The processor can then determine a subspace projection matrix using the first angles without an estimate of the power of noise or interference signals in the received EM energy. Using the subspace projection matrix, the processor can determine an interference-orthogonal subspace projection-based beamformer. With the interference-orthogonal subspace projection-based beamformer, the processor can determine the desired signal output from an adaptive beamformer for the EM energy and second angles corresponding to respective first angles for the objects.

18 Claims, 6 Drawing Sheets

(51) Int. Cl.
G01S 13/02 (2006.01)
G01S 13/931 (2020.01)
H01Q 1/32 (2006.01)

(56) References Cited

U.S. PATENT DOCUMENTS

| | | | |
|---|---|---|---|
| 7,639,171 | B2 | 12/2009 | Alland et al. |
| 9,395,727 | B1 | 7/2016 | Smith et al. |
| 9,869,762 | B1 | 1/2018 | Alland et al. |
| 10,416,680 | B2 | 9/2019 | Li et al. |
| 10,446,923 | B2 | 10/2019 | Watson |
| 10,809,737 | B2 | 10/2020 | Li et al. |
| 10,866,304 | B1 | 12/2020 | Hassibi et al. |
| 11,619,705 | B2 | 4/2023 | Zhang et al. |
| 11,635,506 | B2 | 4/2023 | Wasa et al. |
| 2012/0242535 | A1* | 9/2012 | Kanamoto ............ G01S 13/584 342/158 |
| 2017/0029107 | A1 | 2/2017 | Emami et al. |
| 2017/0149147 | A1 | 5/2017 | Minami et al. |
| 2018/0149736 | A1 | 5/2018 | Alland et al. |
| 2019/0285738 | A1 | 9/2019 | Iwasa et al. |
| 2019/0324133 | A1 | 10/2019 | Hong et al. |
| 2020/0004262 | A1 | 1/2020 | Li et al. |
| 2020/0256947 | A1 | 8/2020 | Motoda |
| 2020/0292690 | A1 | 9/2020 | Kim et al. |
| 2020/0309899 | A1 | 10/2020 | Jonas et al. |
| 2020/0355816 | A1 | 11/2020 | Ishikawa |
| 2021/0373144 | A1 | 12/2021 | Amani et al. |
| 2022/0163623 | A1 | 5/2022 | Kishigami et al. |
| 2022/0236370 | A1 | 7/2022 | Li et al. |
| 2023/0152436 | A1* | 5/2023 | Sharma ................... G01S 13/89 342/417 |

FOREIGN PATENT DOCUMENTS

| | | |
|---|---|---|
| EP | 2662699 A1 | 11/2013 |
| EP | 3757607 A1 | 12/2020 |
| EP | 4036600 A1 | 8/2022 |
| EP | 4043919 A1 | 8/2022 |
| JP | 6523350 B2 | 5/2019 |
| JP | 2020186972 A | 11/2020 |
| WO | 2021096889 A1 | 5/2021 |

OTHER PUBLICATIONS

"Extended European Search Report", EP Application No. 22200994.6, Aug. 11, 2023, 15 pages.
"Extended European Search Report", EP Application No. 23158330.3, Aug. 25, 2023, 17 pages.
Wu, et al., "A Low Complexity Adaptive Algorithm for Eigenspace-Based Two-Dimensional Direction of Arrival Tracking", IEICE Transactions on Fundamentals of Electronics, Communications and Computer Sciences, vol. E92-A, No. 8, Aug. 1, 2019, pp. 2097-2106.
"Extended European Search Report", EP Application No. 21216318.2, May 30, 2022, 10 pages.
Capon, "High-Resolution Frequency-Wavenumber Spectrum Analysis", Proceedings of the IEEE, vol. 57, No. 8, Aug. 1969, pp. 1408-1418.
Chan, et al., "A parameter estimation approach to estimation of frequencies of sinusoids", Apr. 1981, pp. 214-219, 6 pages.
Feger, et al., "A 77-GHz FMCW MIMO Radar Based on an SiGe Single-Chip Transceiver", IEEE Transactions on Microwave Theory and Techniques, vol. 57, No. 5, May 2009, pp. 1020-1035.
Mcglaning, "Multipath Propagation", Wireless Receiver Design for Digital Communications—Chapter 3., Jan. 2012, pp. 190-206.
Qian, et al., "Enhanced PUMA for direction-of-arrival estimation and its performance analysis", Aug. 15, 2016, pp. 4127-4137, 11 pages.
Razavi-Ghods, "Characterisation of MIMO Radio Propagation Channels", Durham theses, Durham University. Available at Durham E-Theses Online: http://etheses.dur.ac.uk/2526/ (Year: 2007), 349 pages.

Scheiner, et al., "Seeing Around Street Corners: Non-Line-of-Sight Detection and Tracking In-the-Wild Using Doppler Radar", Dec. 2019, pp. 2068-2077.
Schmidt, "Multiple Emitter Location and Signal Parameter Estimation", IEEE Transactions on Antennas and Propagation, Mar. 1986, pp. 276-280.
Shi, et al., "Sparsity-Based Two-Dimensional DOA Estimation for Coprime Array: From Sum-Difference Coarray Viewpoint", IEEE Transactions on Signal Processing, vol. 65, No. 21, Nov. 1, 2017, pp. 5591-5604.
Vaidyanathan, et al., "Theory of Sparse Coprime Sensing in Multiple Dimensions", IEEE Transactions on Signal Processing, vol. 59, No. 8, Aug. 2011, pp. 3592-3608.
Yu, et al., "MIMO Adaptive Beamforming for Nonseparable Multipath Clutter Mitigation", IEEE Transactions on Aerospace and Electronic Systems, vol. 50, No. 4, Oct. 2014, pp. 2604-2618.
"Extended European Search Report", EP Application No. 21196393.9, Feb. 28, 2022, 11 pages.
"Extended European Search Report", EP Application No. 21196394.7, Mar. 4, 2022, 11 pages.
"Extended European Search Report", EP Application No. 21215410.8, Jul. 12, 2022, 9 pages.
"Extended European Search Report", EP Application No. 21216322.4, Jun. 3, 2022, 9 pages.
Amin, et al., "Sparse Arrays and Sampling for Interference Mitigation and DOA Estimation in GNSS" Proceedings of the IEEE, vol. 104, No. 6, Jun. 2016, pp. 1302-1317.
Chen, et al., "A new method for joint DOD and DOA estimation in bistatic MIMO radar", Feb. 2010, pp. 714-718.
Engels, et al., "Automotive MIMO Radar Angle Estimation in the Presence of Multipath", Oct. 2017, 5 pages.
Gu, et al., "Adaptive Beamforming via Sparsity-Based Reconstruction of Covariance Matrix", Compressed Sensing in Radar Signal Processing, 2019, 33 pages.
Gu, et al., "Joint SVD of Two Cross-Correlation Matrices to Achieve Automatic Pairing in 2-D Angle Estimation Problems", IEEE Antennas and Wireless Propagation Letters, vol. 6, pp. 553-556, Feb. 2007, 4 pages.
Gu, et al., "Robust Adaptive Beamforming Based on Interference Covariance Matrix Reconstruction and Steering Vector Estimation", IEEE Transactions on Signal Processing, vol. 60, No. 7, Jul. 2012, pp. 3881-3885.
Gu, et al., "Robust Adaptive Beamforming Based on Interference Covariance Matrix Sparse Reconstruction", Signal Processing, vol. 96, Mar. 1, 2014, pp. 375-381.
Haardt, et al., "Unitary ESPRIT: How to Obtain Increased Estimation Accuracy with a Reduced Computational Burden", May 1995, 1232-1242.
Jiang, et al., "Joint DOD and DOA Estimation for Bistatic MIMO Radar in Unknown Correlated Noise", Nov. 2015, 5113-5125.
Jin, "Joint DOD and DOA estimation for bistatic MIMO radar", Feb. 2009, pp. 244-251.
Kikuchi, et al., "Pair-Matching Method for Estimating 2-D Angle of Arrival With a Cross-Correlation Matrix", IEEE Antennas and Wireless Propagation Letters, vol. 5, pp. 35-40, Mar. 2006, 6 pages.
Moffet, "Minimum-Redundancy Linear Arrays", IEEE Transactions on Antennas and Propagation, vol. AP-16, No. 2., Mar. 1968, pp. 172-175.
Pursuant to MPEP § 2001.6(b) the applicant brings the following co-pending application to the Examiner's attention: U.S. Appl. No. 17/075,632.
Roy, et al., "ESPRIT-Estimation of Signal Parameters Via Rotational Invariance Techniques", Jul. 1989, pp. 984-995.
Steinwandt, et al., "Performance Analysis of ESPRIT-Type Algorithms for Co-Array Structures", Dec. 10, 2017, 5 pages.
Sun, et al., "MIMO Radar for Advanced Driver-Assistance Systems and Autonomous Driving: Advantages and challenges", Jul. 2020, pp. 98-117.
Tropp, et al., "Signal Recovery From Random Measurements Via Orthogonal Matching Pursuit", IEEE Transactions on Information Theory, vol. 53, No. 12, Dec. 2007, pp. 4655-4666, Dec. 2007, 12 pages.

(56) References Cited

OTHER PUBLICATIONS

Vaidyanathan, et al., "Sparse Sensing with Co-Prime Samplers and Arrays", IEEE Trans. Signal Process., vol. 59, No. 2, Feb. 2011, pp. 573-586.
Van Trees, "Planar Arrays and Apertures", Essay in "Detection, Estimation, and Modulation Theory, Optimum Array Processing", pp. 231-274. Wiley-Interscience, May 2002, 44 pages.
Visentin, et al., "Analysis of Multipath and DOA Detection Using a Fully Polarimetric Automotive Radar", Apr. 2018, 8 pages.
Wang, et al., "Two-Dimensional Beamforming Automotive Radar with Orthogonal Linear Arrays", 2019 IEEE Radar Conference, Boston, MA, Apr. 22-26, 2019., 6 pages.
Zhou, et al., "A Robust and Efficient Algorithm for Coprime Array Adaptive Beamforming", IEEE Transactions on Vehicular Technology, vol. 67, No. 2, Feb. 2018, pp. 1099-1112.
Zoltowski, et al., "Closed-Form 2-D Angle Estimation with Rectangular Arrays in Element Space or Beamspace via Unitary ESPRIT", Feb. 1996, pp. 316-328.
Zoltowski, et al., "ESPRIT-Based 2-D Direction Finding with a Sparse Uniform Array of Electromagnetic Vector Sensors", Aug. 1, 2000, pp. 2195-2204.
"Extended European Search Report", EP Application No. 22197753.1, Mar. 7, 2023, 17 pages.
Zhang, et al., "Flexible Array Response Control via Oblique Projection", IEEE Transactions on Signal Processing, vol. 67, No. 12, Jun. 15, 2019, pp. 3126-3139.

\* cited by examiner

MULTIPLE-TARGET, SIMULTANEOUS BEAMFORMING FOR FOUR-DIMENSIONAL RADAR SYSTEMS

BACKGROUND

Radar systems use antennas to transmit and receive electromagnetic (EM) signals for detecting and tracking objects. In automotive applications, radar systems provide information about the vehicle's environment and can play an essential role in Advanced Driver Assistance Systems (ADAS). Highly automated systems generally require radar systems with a large dynamic range. Beamforming is a popular approach to improving a radar system's dynamic range via signal strengthening and/or interference suppression. Some adaptive beamforming techniques can increase the strength of the desired signal while suppressing undesired interference and noise. These techniques, however, can incur a high computational cost that may be too computationally complex or require computer hardware that is too expensive for some automotive applications.

SUMMARY

This document describes techniques and systems of multiple-target, simultaneous beamforming for four-dimensional (4D) radar systems. The described techniques enable an example radar system to estimate angles in two dimensions efficiently with a high dynamic range. For example, a radar system includes a processor and an antenna to receive electromagnetic energy reflected by one or more objects. The antenna includes a two-dimensional (2D) array that provides antenna elements positioned in the first and second dimensions. Using electromagnetic energy received by the 2D array, the processor can determine first angles in the first dimension associated with the objects. The processor can then determine a subspace projection matrix using the first angles, which can be determined without estimating the power of noise or interference signals in the received EM energy. Using the subspace projection matrix, the processor can determine an interference-orthogonal subspace projection-based beamformer. With the interference-orthogonal subspace projection-based beamformer, the processor can determine the desired signal output from an adaptive beamformer for the EM energy and second angles corresponding to respective first angles for the objects. In this way, high angular resolution and angle-estimation accuracy may be achieved without requiring expensive computer components, thereby enabling these techniques on a wide range of vehicles, e.g., from economy to luxury classes.

This document also describes methods performed by the above-summarized system and other configurations of the radar system set forth herein and the means for performing these methods.

This Summary introduces simplified concepts related to multiple-target, simultaneous beamforming for 4D radar systems, further described in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of multiple-target, simultaneous beamforming for 4D radar systems are described in this document with reference to the following figures. The same numbers are often used throughout the drawings to reference like features and components.

DETAILED DESCRIPTION

Overview

Radar systems can be configured as an essential sensing technology that vehicle-based systems use to acquire information about the surrounding environment. For example, 4D radar systems can acquire the range, range rate (e.g., Doppler), azimuth angle, and elevation angle for detected objects. Vehicle-based systems can then use this information to take necessary actions (e.g., reduce speed, change lanes) to avoid a collision with one or more detected objects.

Radar systems generally include antennas to transmit and receive EM radiation. Some radar systems have a receive antenna with a two-dimensional (2D) planar array of antenna elements to estimate the azimuth angles and the elevation angles associated with detections. The azimuth and elevation angles can be jointly calculated using 2D super-resolution algorithms (e.g., 2D non-linear least squares (NLS), 2D Estimation of Signal Parameters via Rotational Invariance Technique (ESPRIT), or 2D Multiple Signal Classification (MUSIC) algorithms). These 2D techniques are generally computationally expensive and inefficient. Other radar systems can also independently estimate the azimuth and elevation angles and then use a pairing or matching process to select the most reliable azimuth-elevation combinations when multiple objects or targets are detected. However, such pairing or matching processes still occur in a 2D domain, resulting in computationally expensive and inefficient approaches.

Radar systems can also use beamforming as a spatial-filtering technique to strengthen received radar signals and/or suppress interference. Received radar signals generally include interference signals and/or noise. Conventional delay-and-sum beamformers usually do not have the capability to suppress interference. Adaptive beamformers can, however, increase the strength of the desired return signal while suppressing the undesired interference and noise by adjusting a beamformer weight vector. A typical adaptive beamformer first calculates a weight vector, w, (e.g., $w=[w_1, w_2, \ldots, w_M]^T \in C^M$ for M antenna elements) according to an array observation vector (e.g., $x(k)=[x_1(k), x_2(k), \ldots, x_M(k)]^T \in C^M$) or an array observation matrix (e.g., $X=[x(1), x(2), \ldots, x(K)] \in C^{M \times K}$), then multiplies the received radar signal (e.g., $x(k)$) by the Hermitian of the weight vector (e.g., $w^H$) to obtain the estimate of the desired signal waveform (e.g., $\hat{s}(k)$ with interference suppression).

Recently, engineers have investigated and used interference-plus-noise covariance matrix reconstruction-based adaptive beamformer algorithms to avoid self-nulling problems that existed in previous beamforming solutions. A high computational cost, however, is incurred for such approaches to estimate the interference power and the noise power. The computational cost of such approaches is further increased to associate second angles (e.g., elevation angles) with first angles (e.g., azimuth angles) when multiple targets are detected at the same range bin and Doppler bin.

In contrast, this document describes techniques and systems to provide multiple-target, simultaneous beamforming for 4D radar systems, without requiring the computationally expensive and inefficient processes of previous techniques. For example, a radar system can include an antenna array with a 2D array. The 2D array includes multiple antenna elements positioned in a first dimension and a second dimension. Using EM energy received by the 2D array, the radar system determines the first angles associated with detections in the first dimension. The radar system can then use the first angles to determine a subspace projection matrix without estimating a noise power or interference power for the received EM energy. The radar system can also estimate an interference-orthogonal subspace projection-based beamformer, which is a function of the subspace projection matrix and a steering vector. The steering vector is a function of the first angles. Using a Hermitian of the interference orthogonal subspace projection-based beamformer, the radar system can estimate a desired signal output of the EM energy without the interference signals. The second angles associated with the objects and corresponding to respective first angles can then be determined using beam vector information of the desired signal output. In this way, the computational complexity for the described radar system to estimate angles in two dimensions (e.g., azimuth and elevation angles) is improved by not having to estimate the interference power nor the noise power in the received EM signal. For multiple-object scenarios, the described techniques also reduce the computational complexity to associate second angles with respective first angles for each object. The described angle-finding technique can also be applied to various configurations of the described 2D array.

This example is just one example of the described techniques and systems of a radar system that provides multiple-target, simultaneous beamforming. This document describes other examples and implementations.

Operating Environment

Figure 1:
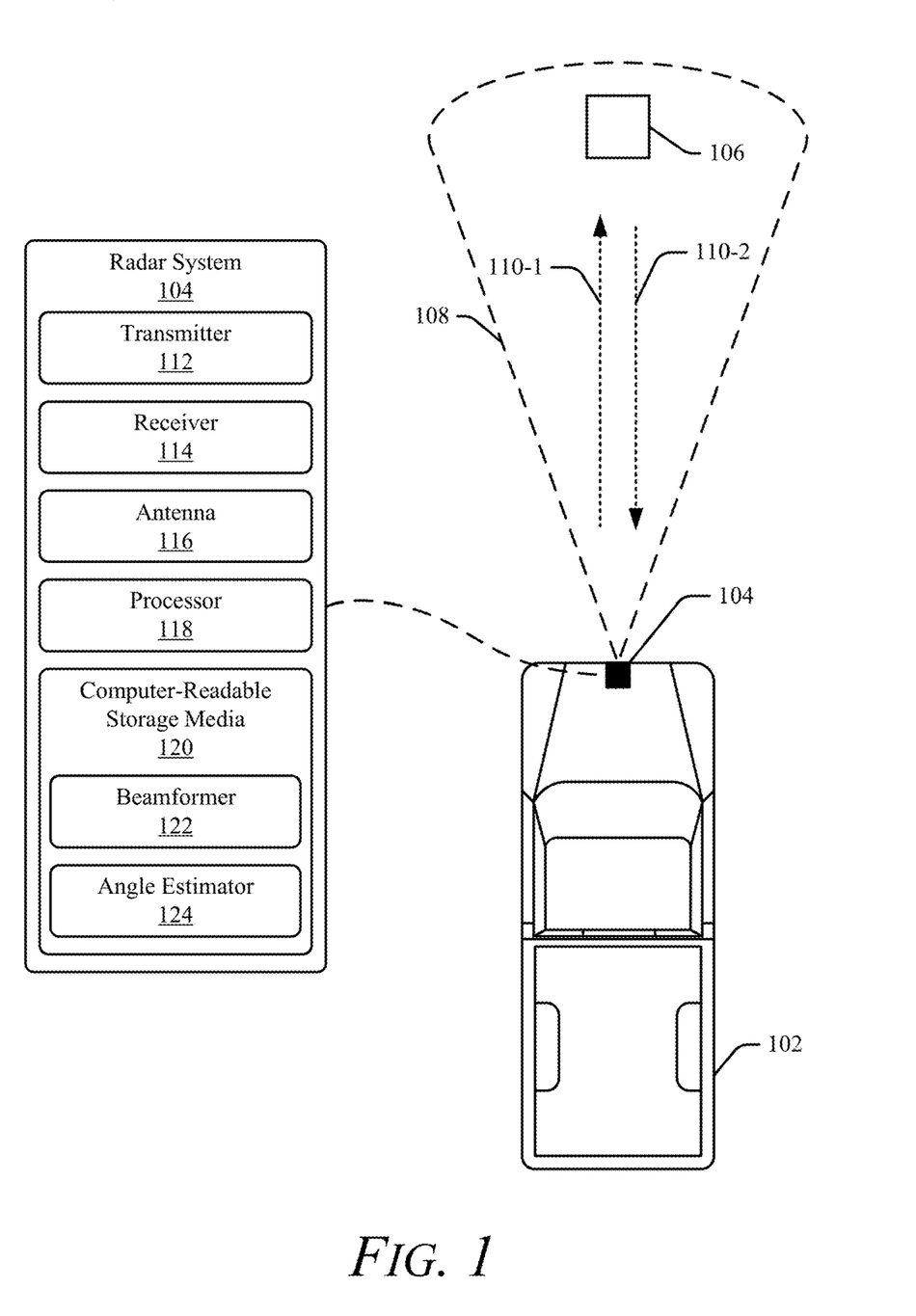
FIG. 1 illustrates an example environment in which a radar system with multiple-target, simultaneous beamforming can be implemented.

FIG. 1 illustrates an example environment 100 in which a radar system 104 with multiple-target, simultaneous beamforming can be implemented in accordance with the techniques of this disclosure. In the depicted environment 100, a vehicle 102 is equipped with the radar system 104. The depicted environment 100 includes the vehicle 102 traveling on a roadway.

Although illustrated as a car, the vehicle 102 can represent other types of motorized vehicles (e.g., an automobile, a motorcycle, a bus, a tractor, a semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount or integrate the radar system 104 to any moving platform, including moving machinery or robotic equipment.

The radar system 104 enables other systems of the vehicle 102 (not shown for simplicity in the drawings) to detect at least one object 106 (and often multiple objects) within the vicinity of the vehicle 102, which may impact how or whether the vehicle 102 can continue to travel along the roadway. These other systems may be operatively and/or communicatively coupled to the radar system 104 using wired and/or wireless links that act as interconnections, paths, or busses for vehicle inter-component communications. Outputs from the radar system 104 enable their vehicle-based functions, some non-limiting examples of which include a system for autonomous control, safety, localization, vehicle-to-vehicle communication, an occupant interface, and/or a radar or multi-sensor tracker.

The radar system 104 illuminates a region of interest in the environment 100, which at least partially surrounds the vehicle 102. This region of interest is referred to as a field-of-view 108, which can also be referred to as an instrumented field-of-view. Careful selection and/or positioning of components of the radar system 104 may cause the field-of-view 108 to have a particular shape or size. Components of the radar system 104 can be installed on, mounted to, or integrated with any part of the vehicle 102, such as in a front, back, top, bottom, or side portion of the vehicle 102, a bumper, a side mirror, part of a headlight and/or taillight, or at any other interior or exterior location from where the object 106 requires detection.

In some cases, the vehicle 102 includes multiple radar systems 104, such as a first radar system 104 and a second radar system 104, that provide a larger field-of-view 108. In general, the radar system 104 can be designed to have parts of the radar system 104 distributed at different locations of the vehicle 102 to provide a particular field-of-view 108 that encompasses a region of interest. Example fields-of-view include a 360-degree field-of-view, one or more 180-degree fields-of-view, one or more 90-degree fields-of-view, and so forth, which can overlap or be combined into a field-of-view of a particular size.

The radar system 104 can emit EM radiation via antenna elements by transmitting waveforms or radar signals 110-1 into the field-of-view 108. EM radiation that reflects back from the environment 100 can be processed as radar return signals 110-2 to determine the range, angles (e.g., azimuth angle and elevation angle), range rate (e.g., Doppler), or other characteristics of objects 106 in the environment 100 relative to a position and orientation of the vehicle 102. For example, in the environment 100, the radar system 104 can detect and track the object 106 by transmitting the radar signals 110-1 and receiving the radar return signals 110-2. As one example, the radar system 104 transmits the radar signals 110-1 between one hundred and four hundred gigahertz (GHz), between four and one hundred GHz, or between approximately seventy and eighty GHz. As discussed above, the radar return signals 110-2 can include reflections of the radar signals 110-1 by the object(s) 106, interference from other sources, and/or noise.

The object 106 is composed of one or more materials that reflect radar signals. The object 106 can represent a target of interest depending on the application. In some cases, the object 106 can be a moving object (e.g., another vehicle) or a stationary object (e.g., a roadside sign). The radar system 104 can also determine multiple objects 106 that are located in the same range bin and the same Doppler bin. Such objects 106, however, generally have different azimuth angles with different elevation angles. In these situations, the radar system 104 must determine the azimuth angle and corresponding elevation angle associated with each object 106. As described above, the computational cost of determining the angles associated with multiple objects 106 can be relatively high. The techniques described in this document can significantly reduce the associated computation cost for multiple-target scenarios.

The radar system 104 can include a transmitter 112 and at least one antenna 116 to transmit the radar signals 110-1. The radar system 104 can also include a receiver 114 and at least one antenna 116 to receive the radar return signals 110-2. The transmitter 112 includes one or more components for emitting the radar signals 110-1. The receiver 114 includes one or more components for detecting the radar return signals 110-2. The transmitter 112 and the receiver 114 can be incorporated together on the same integrated circuit (e.g., a transceiver integrated circuit) or separately on different integrated circuits. In other implementations, the radar system 104 does not include a separate antenna 116, but the transmitter 112 and the receiver 114 each have an antenna or antenna elements.

The antenna 116 includes multiple antenna elements, which represent physical locations or phase-center locations of portions of a 2D array, a one-dimensional (1D) array, and/or a concatenated 1D array. The antenna elements can also represent synthetic locations or phase-center locations of components of the antenna 116 formed by multiple-input and multiple-output (MIMO) techniques.

The antenna 116 can be fixed to a printed circuit board (PCB) and include the 2D array with antenna elements in a first dimension (e.g., an azimuth direction) and a second dimension (e.g., an elevation direction). The antenna 116 can be fabricated with different materials, components, and techniques in other implementations. For example, the antenna 116 can include a lens antenna, a metalized plastic antenna, a dish antenna, a horn antenna, or a combination thereof.

The second dimension can be orthogonal or not orthogonal to the first dimension. As discussed in greater detail below, the angle estimator 124 can determine second angles in the second dimension if the relative placement of the antenna elements is known, even if the second dimension is not orthogonal to the first dimension. In addition, the first dimension and the second dimension can correspond to the azimuth direction and the elevation direction, respectively, or vice versa. In other implementations, the first dimension and the second dimension can be rotated at an angle relative to the azimuth direction and the elevation direction.

The antenna elements of the 2D array can be arranged in an approximately rectangular shape. In other implementations, the antenna elements of the 2D array can be arranged in an approximately rhombus shape, with the second dimension not being orthogonal to the first dimension. In yet other implementations, the antenna elements of the 2D array in the first dimension can be unaligned from the antenna elements in the second dimension. The antenna elements of the 2D array can also be arranged in a two-dimensional sparse array. The 2D array implemented by the antenna 116 is generally a sparse 2D array that includes at least four antenna elements. The antenna elements can be spaced apart by a first distance in the first dimension and a second distance in the second dimension. In other words, the 2D array can be a uniform 2D array. In other implementations, the 2D array can include non-uniform spacing among antenna elements in the first dimension and/or the second dimension.

The antenna 116 can also include a 1D array or a concatenated 1D array (e.g., an extension of a row or column of the 2D array). The 1D array can be specifically designed for first angle estimation. For example, the 1D array can have an aperture or antenna-element spacing to obtain a desired resolution or accuracy for first angle estimation. To increase the aperture of the 1D array, the antenna 116 can include a concatenated 1D array that increases the aperture of a subset of the 2D array to improve the resolution of estimating first angles. The 1D array is generally positioned in the first dimension or an azimuth direction. In other implementations, the 1D array can be positioned in the second dimension, an elevation direction, or another direction.

The 1D array can be a sparse linear array that includes multiple antenna elements. The antenna elements can be spaced apart by a specific distance, resulting in a uniform linear array. The arrangement of the 1D array and the 2D array can be chosen based on the position and configuration of other components in the radar system 104. The 2D array can include M antenna elements (e.g., at least four). In automotive applications, the number of antenna elements in the 2D array can be greater than an anticipated maximum number of objects 106, K, to be detected by the radar system 104 at the same range bin and Doppler bin. The 2D array generally includes at least four antenna elements not encompassed by the 1D array.

The 1D array and the 2D array can be planar arrays that provide high gain and low loss. Planar arrays are well-suited for vehicle integration due to their small size. For example, the antenna elements can be slots etched or otherwise formed in a plating material of one surface of a PCB for a substrate-integrated waveguide (SIW) antenna. As another example, the antenna elements can be radiation slots of a waveguide antenna built with metalized plastic and/or metal. The antenna elements can also be part of an aperture antenna, a microstrip antenna, or a dipole antenna. For example, the 1D array and the 2D array can include subarrays of patch elements (e.g., microstrip patch antenna subarrays) or dipole elements.

The radar system 104 also includes one or more processors 118 (e.g., an energy processing unit) and computer-readable storage media (CRM) 120. The processor 118 can be a microprocessor or a system-on-chip. The processor 118 can execute computer-executable instructions stored in the CRM 120. For example, the processor 118 can process the radar return signals 110-2 received by the antenna 116 and determine, using a beamformer 122 and an angle estimator 124, a location of the object(s) 106 relative to the radar system 104 in four dimensions: range, Doppler, azimuth angle, and elevation angle. The processor 118 can also generate radar data for at least one automotive system. For example, the processor 118 can control, based on processed EM energy from the antenna 116, an autonomous or semi-autonomous driving system of the vehicle 102.

The beamformer 122 can process the radar return signals 110-2 to suppress the interference signals and noise and to strengthen the radar return signals 110-2. The angle estimator 124 obtains the radar return signals 110-2 received by the antenna 116 or the receiver 114 and determines angles (e.g., azimuth and elevation angles) associated with the objects 106. The beamformer 122 and the angle estimator 124 can be implemented as instructions in the CRM 120, hardware, software, or a combination thereof executed by the processor 118.

The radar system 104 can determine a distance to the object 106 based on the time it takes for the EM signals to travel from the radar system 104 to the object 106 and from the object 106 back to the radar system 104. The radar system 104 can also determine, using the beamformer 122 and the angle estimator 124, a location of the object 106 in terms of a first angle (e.g., azimuth angle) and a second angle (e.g., elevation angle) based on the direction of a maximum-amplitude echo signal received by the radar system 104.

The vehicle 102 can also include at least one automotive system that relies on data from the radar system 104, such as a driver-assistance system, an autonomous-driving system, or a semi-autonomous-driving system. The radar system 104 can include an interface to an automotive system that relies on the data. For example, the processor 118 outputs, via the interface, a signal based on EM energy received by the receiver 114 or the antenna 116.

Generally, the automotive systems use radar data provided by the radar system 104 to perform a function. For example, the driver-assistance system can provide blind-spot monitoring and generate an alert that indicates a potential collision with the object 106 detected by the radar system 104. The radar data from the radar system 104 indicates when it is safe or unsafe to change lanes in such an implementation. The autonomous-driving system may move the vehicle 102 to a particular location on the roadway while avoiding collisions with the object 106 detected by the radar system 104. The radar data provided by the radar system 104 can provide information about the distance to, speed, and the location of the object 106 to enable the autonomous-driving system to perform emergency braking, perform a lane change, or adjust the speed of the vehicle 102.

Example Vehicle Configuration

Figure 2:
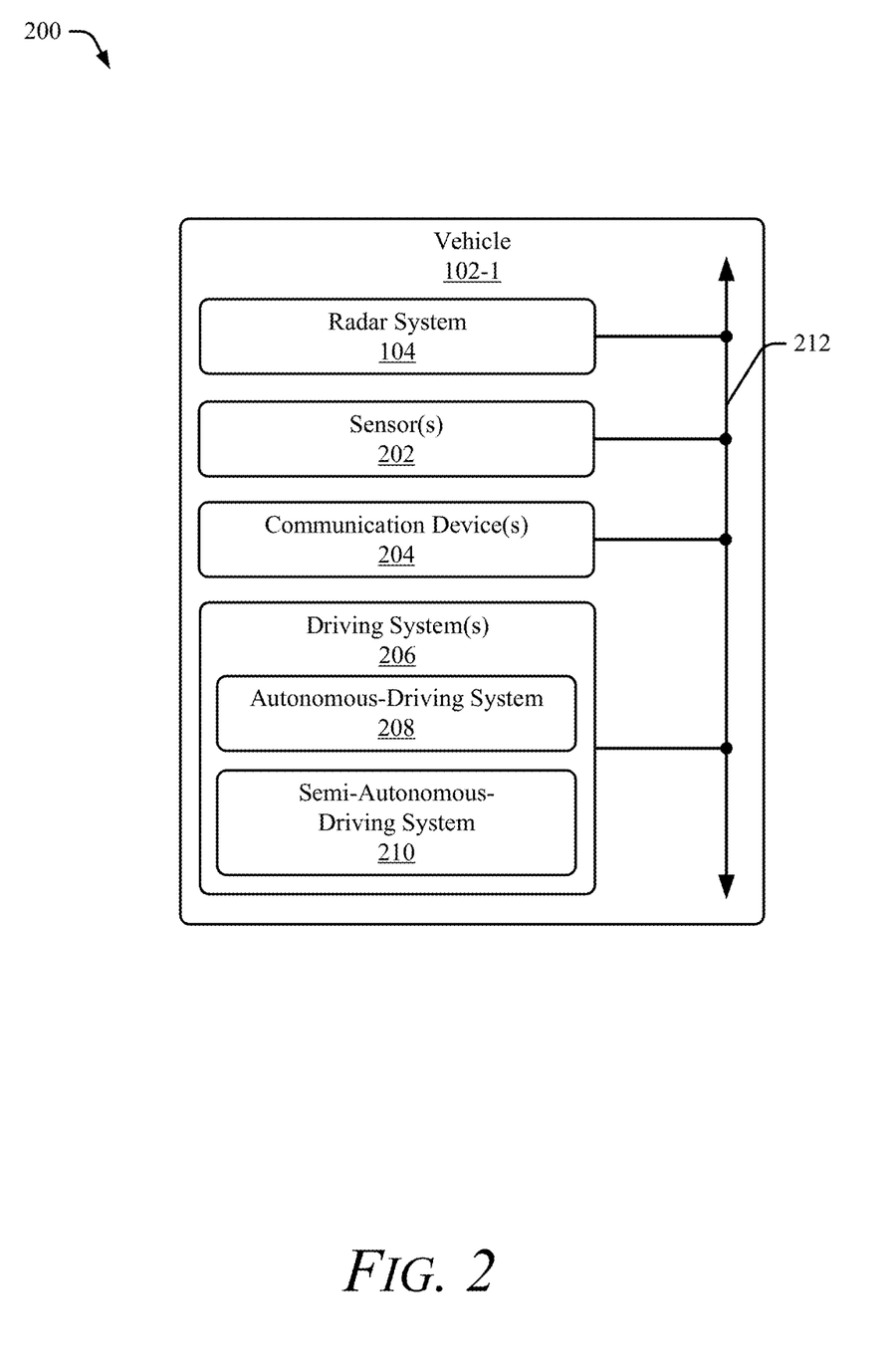
FIG. 2 illustrates an example vehicle configuration using a radar system with multiple-target, simultaneous beamforming in accordance with techniques of this disclosure.

FIG. 2 illustrates an example vehicle configuration 200 using a radar system with multiple-target, simultaneous beamforming in accordance with techniques of this disclosure. A vehicle 102-1, which is an example of the vehicle 102 of FIG. 1, relies on the radar system 104 to generate radar data. In addition, the vehicle 102-1 includes other sensors 202, communication devices 204, and driving systems 206, which include an autonomous-driving system 208 and/or semi-autonomous-driving system 210. The radar data from the radar system 104 can be used by the sensors 202, the communication devices 204, and/or the driving systems 206 to control operations of the vehicle 102-1. The vehicle 102-1 can include many other systems that interface with the radar system 104 to perform radar-based vehicle functions.

The sensors 202 can include a location sensor, a camera, a lidar system, or a combination thereof. The location sensor, for example, can include a positioning system that can determine the position of the vehicle 102-1. The camera system can be mounted on or near the front of the vehicle 102-1. The camera system can take photographic images or videos of a roadway. In other implementations, a portion of the camera system can be mounted into a rear-view mirror of the vehicle 102-1 to have the field-of-view 108 of the roadway. In yet other implementations, the camera system can project the field-of-view 108 from any exterior surface of the vehicle 102-1. For example, vehicle manufacturers can integrate at least a part of the camera system into a side mirror, bumper, roof, or any other interior or exterior location where the field-of-view 108 includes a roadway. The lidar system can use electromagnetic signals to detect the object 106 (e.g., other vehicles) on the roadway. Data from the lidar system can provide an input to the radar system 104. For example, the lidar system can determine the traveling speed of a vehicle in front of the vehicle 102-1 or nearby vehicles traveling in the same direction as the vehicle 102-1, which can be used by the radar system 104 to generate more accurate radar data for the objects 106 detected in the field-of-view 108.

The communication devices 204 can be radio frequency (RF) transceivers to transmit and receive RF signals. The transceivers can include one or more transmitters and receivers incorporated together on the same integrated circuit (e.g., a transceiver integrated circuit) or separately on different integrated circuits. The communication devices 204 can be used to communicate with remote computing devices (e.g., a server or computing system providing navigation information or regional speed limit information), nearby structures (e.g., construction zone traffic signs, traffic lights, school zone traffic signs), or nearby vehicles. For example, the vehicle 102-1 can use the communication devices 204 to wirelessly exchange information with nearby vehicles using vehicle-to-vehicle (V2V) communication. The vehicle 102-1 can use V2V communication to obtain the speed, location, and heading of nearby vehicles. Similarly, the vehicle 102-1 can use the communication devices 204 to wirelessly receive information from nearby traffic signs or structures to indicate a temporary speed limit, traffic congestion, or other traffic-related information using vehicle-to-everything (V2X) communication.

The communication devices 204 can include a sensor interface and a driving system interface. The sensor interface and the driving system interface can transmit data over a communication bus 212 of the vehicle 102-1, for example, between the radar system 104 and the driving systems 206.

Generally, the automotive systems use radar data provided by the radar system 104 to perform a function. For example, the driver-assistance system can provide blind-spot monitoring and generate an alert that indicates a potential collision with the objects 106 that is detected by the radar system 104. The radar data from the radar system 104 indicates when it is safe or unsafe to change lanes in such an implementation. The autonomous-driving system may move the vehicle 102-1 to a particular location on a roadway while avoiding collisions with the objects 106 detected by the radar system 104. The radar data provided by the radar system 104 can provide information about the distance to and the location of the objects 106 to enable the autonomous-driving system to perform emergency braking, perform a lane change, or adjust the speed of the vehicle 102-1.

The vehicle 102-1 can also include at least one automotive system that relies on data from the radar system 104, such as the autonomous-driving system 208 or the semi-autonomous-driving system 210. The driving system 206 is an example of such an automotive system. The radar system 104 can include an interface to the driving systems 206 that rely on the radar data. For example, via the interface, the processor 118 outputs a signal based on EM energy from the radar return signals 110-2.

The driving systems 206 rely on data from the radar system 104 to control the operation of the vehicle 102-1 (e.g., set the driving speed or avoid the objects 106). Generally, the driving systems 206 use data provided by the radar system 104 and/or the sensors 202 to control the vehicle 102-1 and perform certain functions. For example, the semi-autonomous driving system 210 can provide adaptive cruise control and dynamically adjust the travel speed of the vehicle 102-1 based on the presence of the object 106 in front of the vehicle 102-1. In this example, the data from the radar system 104 can identify the object 106 and its speed and location (e.g., in terms of range, azimuth angle, and elevation angle) in relation to the vehicle 102-1.

The autonomous driving system 208 can navigate the vehicle 102-1 to a particular destination while avoiding the object 106 as identified by the radar system 104. The data provided by the radar system 104 about the object 106 can provide information about the location and/or speed of the object 106 to enable the autonomous driving system 208 to adjust the speed of the vehicle 102-1.

Example Beamforming Techniques

Figure 3:
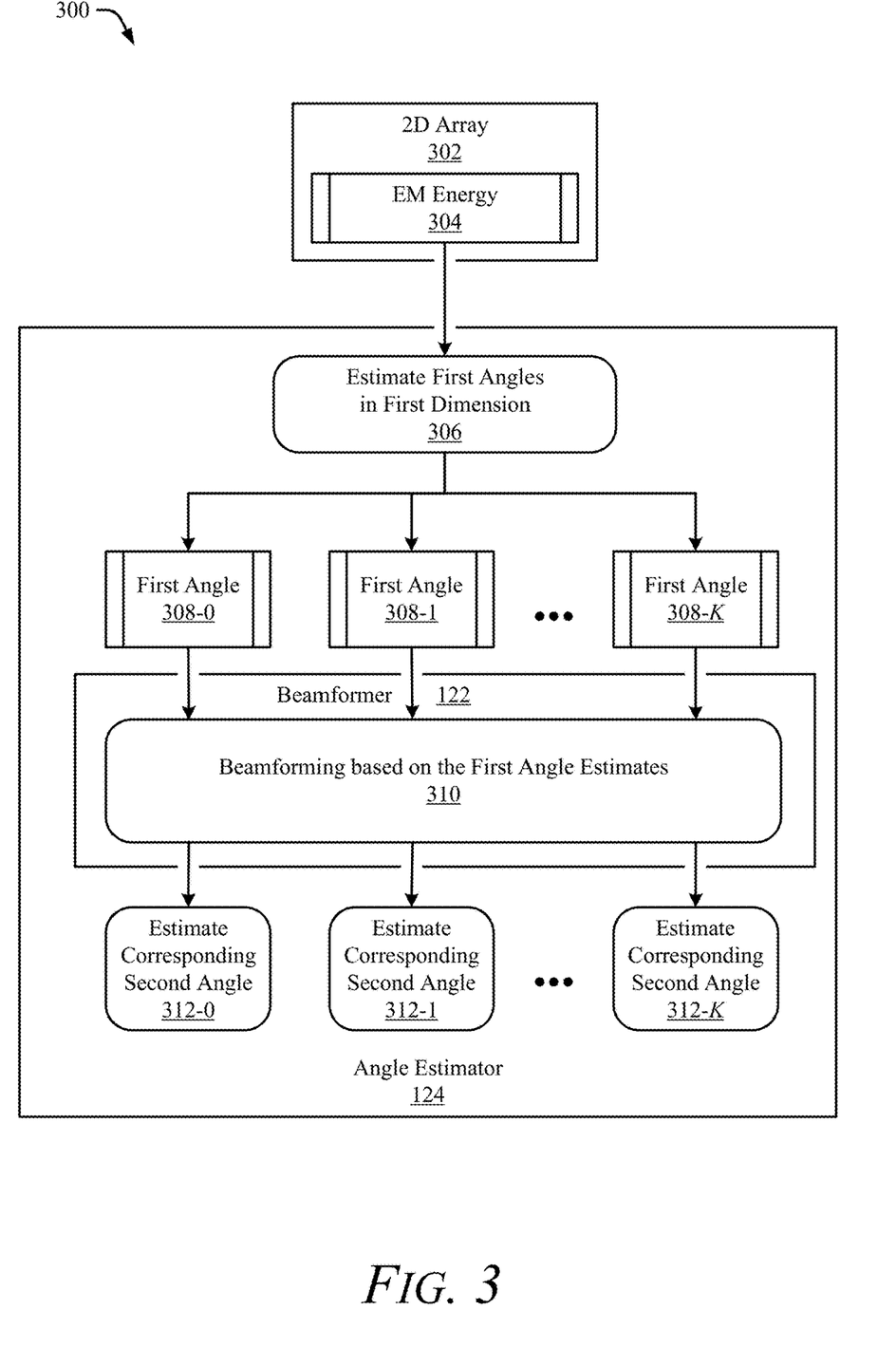
FIG. 3 illustrates an example conceptual diagram of an angle estimator to perform multiple-target simultaneous beamforming.

FIG. 3 illustrates an example conceptual diagram 300 of an angle-estimator module to perform multiple-target simultaneous beamforming. The radar system, beamformer, and angle estimator module of FIG. 3 can, for example, be the radar system 104, the beamformer 122, and the angle estimator 124, respectively, of FIG. 1. The radar system 104 includes a 2D array 302, which can include a variety of configurations, including the configurations discussed with respect to antenna 116 of FIG. 1.

At 306, the angle estimator 124 obtains EM energy 304 (e.g., the radar return signals 110-2) received by the 2D array 302 and estimates first angles 308-0, 308-1, . . . 308-K, $\theta_0$, $\theta_1$, . . . , $\theta_K$, associated with detections of one or more objects 106, where K+1 represents the number of objects 106. The number of objects 106 can be estimated using various methods, including model order selection algorithms (e.g., Akaike Information Criterion or Bayesian Information Criterion). The angle estimator 124 obtains the EM energy received by the 1D array or the concatenated 1D array discussed with respect to antenna 116 of FIG. 1 in other implementations. The EM energy 304 can be digitally sampled EM energy received by the antenna 116.

The angle estimator 124 can use various angle-finding functions to determine the first angles 308 from the EM energy 304. As non-limiting examples, the angle estimator 124 can use a MUSIC, ESPRIT, or a non-linear least squares (NLS) technique to estimate the direction of arrival of the EM signals received by the 2D array 302, the 1D array, or the concatenated 1D array. The angle estimator 124 can also use a pseudo-spectrum function, including a Space-Alternating Generalized Expectation-maximization (SAGE), Delay-and-Sum (DS), and/or Minimum Variance Di stortionless Response (MVDR) based-function, to estimate the first angles 308. As another example, the angle estimator 124 can use fast Fourier transform (FFT) beamforming to estimate the first angles 308. The angle estimator 124 can determine the first angle estimates with relatively low processing complexity and cost.

At 310, the beamformer 122 performs beamforming based on the first angles 308. As described in greater detail with reference to FIG. 4, the beamformer 122 determines an interference-orthogonal subspace projection-based beamformer that does not require an estimation of the noise power or the interference power in the EM energy 304. The beamformer 122 determines the interference-orthogonal subspace projection-based beamformer, $w_{OSP}$, for the first angles 308 simultaneously. By generating a beamformer based on the first angles 308, subsequent second angle estimates are exclusively paired with the respective first angles 308. In this way, the angle estimator 124 does not need to perform a different technique or operation to associate second angle estimates with the first angles 308.

At 312 (e.g., operations 312-0, 312-1, . . . , 312-K), the angle estimator 124 estimates second angles, $\phi_0$, $\phi_1$, . . . , $\phi_K$, associated with the detections, where K+1 represents the number of detections or objects in the first dimension. Here, $\phi_k=[\phi_1, \phi'_k, \phi''_k, \ldots]$ denotes the estimated second angles corresponding to the first angle 308-$k$.

Using the beamformer Wimp, the angle estimator 124 estimates the second angles using a single-snapshot approach, including phase compare, fast Fourier transform (FFT), and NLS techniques. The described techniques to perform multiple-target, simultaneous beamforming allow the angle estimator 124 to operate on 2D arrays where the second dimension is not orthogonal to the first dimension. Because the second dimension is coupled with the first dimension in the beamformer $w_{OSP}$, the first-dimension information is compensated for as long as the relative position of the subarrays in the 2D array 302 is known. For similar reasons, the angle estimator 124 can use the described techniques to estimate the second angles even if the subarrays of the 2D array 302 are not aligned along the second dimension (e.g., the elevation angle).

Figure 4:
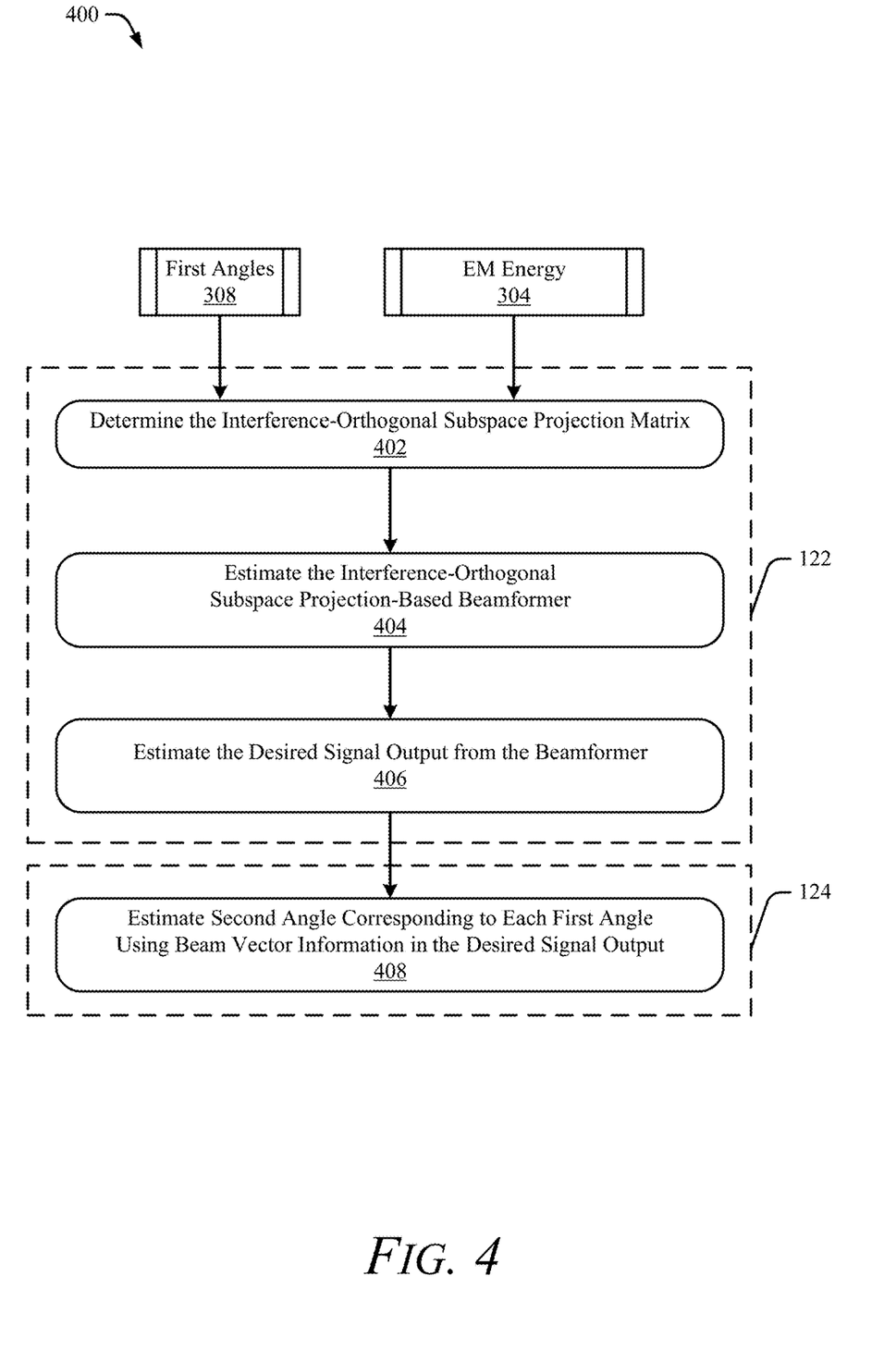
FIG. 4 illustrates an example conceptual diagram of an angle estimator determining second angles by using an interference orthogonal subspace projection-based beamformer.

FIG. 4 illustrates an example conceptual diagram 400 of an angle estimator 124 determining second angles by using an interference-orthogonal subspace projection-based beamformer. The angle estimator 124 of FIG. 4 can be the angle estimator 124 of FIGS. 1 and 3. As described with respect to FIG. 3, the angle estimator 124 determines the first angles 308 associated with detections of the objects 106. Inputs to the conceptual diagram 400 include each first angle 308 (e.g., first angle 306-$k$) and the EM energy 304.

At 402, the beamformer 122 can determine an interference-orthogonal subspace projection matrix, P⊥/i. To illustrate the computational efficiency of the described beamforming techniques, the covariance matrix reconstruction-based adaptive beamforming approach will be described. In particular, the interference-orthogonal subspace projection matrix is developed from investigating the inversion of the interference-plus-noise covariance matrix, $R_{i+n}^{-1}$.

It is assumed there is a single desired signal within the radar return signals 110-2 and K≥1 interferences impinging on an array consisting of M receiving antenna elements of the antenna 116. The array observation data from the EM energy 304 can be modeled using Equation (1):

$$x(t)=x_s(t)+x_i(t)+n(t), \qquad (1)$$

where $x_s(t)=a_0s_0(t) \in C^M$ is the desired signal term with $s_0(t) \in C$ and $a_0 \in C^M$ respectively denoting the desired signal to be estimated and its corresponding steering vector. Similarly, $x_i(t)=\Sigma_{k=1}^{K} a_k s_k(t)$ is the interference term with respect to the desired signal term with $s_k(t) \in C$ and $a_k \in C^M$ respectively denoting the k-th interference and its corresponding interference steering vector. Unlike the desired signal and interference signal, there is no specific direction for the noise n(t), which then can be assumed to be Gaussian white noise with power $\sigma_n^2$.

In order to maintain the desired signal while suppressing the interference and noise, the minimum variance distortionless response (MVDR) beamforming criterion can be adopted, which is expressed in Equation (2), to obtain the optimal beamformer weight vector w:

$$\min_w w^H R_{i+n} w \text{ subject to } w^H a_0 = 1, \qquad (2)$$

where $R_{i+n}$ is the interference-plus-noise covariance matrix, denoted by Equation (3):

$$R_{i+n}=E\{(x_i(t)+n(t))(x_i(t)+n(t))^H\}=A_i\Sigma_i A_i^H+\sigma_n^2 I \qquad (3)$$

Here, $A_i=[a_1, \ldots, a_K] \in C^{M \times K}$ is the interference steering matrix, $\Sigma_i=\text{diag}(\sigma_1^2, \ldots, \sigma_K^2)$ is a diagonal matrix with diagonal entries denoting the interference power, and I is an identity matrix. The k-th column of the interference steering matrix is the steering vector of the k-th interferer, which can be defined using Equation (4):

$$a_k = \left[ e^{-j\frac{2\pi}{\lambda}d_1 \sin\theta_k} \quad e^{-j\frac{2\pi}{\lambda}d_2 \sin\theta_k} \quad \ldots \quad e^{-j\frac{2\pi}{\lambda}d_M \sin\theta_k} \right]^T \in C^M \qquad (4)$$

Here, $\theta_k$ is the first angle 308-$k$, $\{d_1, d_2, \ldots, d_M\}$ denote the positions of M sensors in the first dimension of a 2D array or 1D array, and $\lambda$ denotes the signal wavelength. If the first dimension of the 2D array or the 1D array is a uniform linear array, Equation (4) can be simplified to Equation (4-1):

$$a_k = \begin{bmatrix} 1 & e^{-j\frac{2\pi}{\lambda}d\sin\theta_k} & \ldots & e^{-j\frac{2\pi}{\lambda}(M-1)d\sin\theta_k} \end{bmatrix}^T \quad (4\text{-}1)$$

where d denotes the antenna inter-element spacing for a uniform linear array.

By using the Lagrange multipliers method, the MVDR beamformer can be expressed using Equation (5):

$$w_{MVDR} = \beta R_{i+n}^{-1} a_0, \quad (5)$$

where $$\beta = \frac{1}{a_0^H R_{i+n}^{-1} a_0}$$

is a real-valued scalar that does not affect the beamformer output signal-to-interference-plus-noise ratio (SINR). As illustrated by Equation (5), the MVDR beamformer is a function of the interference-plus-noise covariance matrix $R_{i+n}$ and the signal steering vector $a_0$.

As a result, multiplying the array observation vector x(t) by a Hermitian of the beamformer weight vector $w_{MVDR}^H$, the estimate of desired signal $s_0(t)$ can be determined using Equation (6):

$$\widehat{s_0}(t) = w_{MVDR}^H x(t) = \beta a_0^H R_{i+n}^{-1} x(t). \quad (6)$$

In order to reconstruct the interference-plus-noise covariance matrix for the calculation of the MVDR beamformer, both the interference power $[\sigma_1^2, \ldots, \sigma_K^2]$ and the noise power a need to be estimated, which leads to a high computational cost. It is noted that in order to calculate the MVDR beamformer, the interference-plus-noise covariance matrix $R_{i+n}$ should be inversed before multiplying it by the desired signal steering vector $a_0$. According to the matrix inversion lemma (e.g., the Woodbury matrix identity or the Sherman-Morrison-Woodbury Identity), the inverse of interference-plus-noise covariance matrix $R_{i+n}$ is given by Equation (7):

$$R_{i+n}^{-1} = \left(A_i \sum_i A_i^H + \sigma_n^2 I\right)^{-1} = \frac{1}{\sigma_n^2}\left(I - A_i\left(A_i^H A_i + \sigma_n^2 \sum_i^{-1}\right)^{-1} A_i^H\right), \quad (7)$$

where all diagonal entries of $A_i^H A_i$ are equal to a constant M (e.g., the number of array antenna elements) and the diagonal loading term $\sigma_n^2 \Sigma_i^{-1} = \text{diag}(\sigma_n^2/\sigma_1^2, \ldots, \sigma_n^2/\sigma_K^2)$ reflects the noise-to-interference ratios (e.g., the reciprocal of the interference-to-noise ratios (INRs)). It is observed that, the diagonal loading term $\sigma_n^2 \Sigma_i^{-1}$ can be ignored because the inequality $\sigma_n^2/\sigma_k^2 \ll M$, $\forall k \in \{1, \ldots, K\}$ generally holds true in 4D automotive radar applications.

As a result, the inverse of interference-plus-noise covariance matrix, $R_{i+n}^{-1}$, degrades into the interference-orthogonal subspace projection matrix, P⊥/i, given by Equation (8):

$$R_{i+n}^{-1} \approx P\text{⊥}/i = I - A_i(A_i^H A_i)^{-1} A_i^H \quad (8)$$

if the scale factor $$\frac{1}{\sigma_n^2}$$

is ignored. Note that $A_i(A_i^H A_i)^{-1} A_i^H$ is the interference subspace. It is noted that this scale factor does not affect the beamformer output SINR, which is defined by Equation (9):

$$\text{SINR} = \frac{\sigma_0^2 |w^H a_0|^2}{w^H R_{i+n} w}, \quad (9)$$

where $\sigma_0^2 = E\{|s_0(t)|^2\}$ denotes the desired signal power.

At 404, the beamformer 122 estimates, using the interference-orthogonal subspace projection matrix, the interference-orthogonal subspace projection-based beamformer, $w_{OSP}$. The MVDR beamformer described above is simplified to an interference-orthogonal subspace projection-based beamformer defined by Equation (10):

$$w_{OSP} = \beta' P\text{⊥}/i a_0, \quad (10)$$

where $$\beta' = \frac{1}{a_0^H P_i^\perp a_0}$$

is a real-valued scalar that does not affect the beamformer output SINR. The desired signal steering vector, $a_0$, can be determined using Equation (4) and the first angle estimates 308-0.

Compared with the interference-plus-noise covariance matrix reconstruction-based beamformer, there is no interference and noise power estimation required in the described interference-orthogonal subspace projection-based beamformer.

At 406, the beamformer 122 estimates the desired signal output from the beamformer. The estimate of desired signal $s_0(t)$ is determined by multiplying the array observation vector x(t) by the beamformer weight vector $w_{OSP}^H$, as denoted by Equation (11):

$$s_0(t) = w_{OSP}^H x(t) = \beta' a_0^H P\text{⊥}/i x(t). \quad (11)$$

At 408, the angle estimator 124 estimates second angles, $\phi_k = [\phi_k, \phi'_k, \phi''_k, \ldots]$, associated with the first angle 308, $\theta_k$, $\forall k = 0, 1, \ldots, K$. Using vector information of the desired signal output in the first dimension associated with the first angles 308, the angle estimator 124 estimates the second angles using a single-snapshot approach, including phase compare, FFT, and NLS techniques. The second angles can be determined simultaneously or sequentially.

The array observation data of the EM energy 304 can be rewritten as denoted by Equation (12):

$$x(t) = As(t) + n(t), t = 1, \ldots, T, \quad (12)$$

where $A = [a_0 A_i] \in \mathbb{C}^{M \times (K+1)}$, $s(t) = [s_0(t) s_i(t)]^T \in \mathbb{C}^{K+1}$, and T denotes the number of snapshots. In 4D automotive imaging radar, the snapshots can be obtained from the subarray in another dimension (e.g., the elevation dimension) if the dimension for beamforming is the azimuth dimension.

It is noted that, the beamformer output $w_{OSP}^H x(t)$ is the same as the corresponding least square solution of Equation (12). For example, the least square solution of Equation (12) is denoted by Equation (13):

$$\hat{s}(t) = \left[A^H A\right]^{-1} A^H x(t) = \quad (13)$$

$$\left[\begin{bmatrix} a_0^H \\ A_i^H \end{bmatrix} \begin{bmatrix} a_0 & A_i \end{bmatrix}\right]^{-1} \begin{bmatrix} a_0^H \\ A_i^H \end{bmatrix} x(t) = \begin{bmatrix} a_0^H a_0 & a_0^H A_i \\ A_i^H a_0 & A_i^H A_i \end{bmatrix}^{-1} \begin{bmatrix} a_0^H \\ A_i^H \end{bmatrix} x(t).$$

According to block matrix inversion, we have the estimate of $s_0(t)$ in Equation (14):

$$\hat{s}_0(t) = [a_0^H a_0 - a_0^H A_i (A_i^H A_i)^{-1} A_i^H a_0]^- a_0^H [I - A_i (A_i^H A_i)^{-1} A_i^H] x(t), \quad (14)$$

where $$\left[a_0^H a_0 - a_0^H A_i \left(A_i^H A_i\right)^{-1} A_i^H a_0\right]^{-1} = \frac{1}{a_0^H P_i^\perp a_0}$$

is the real-valued coefficient β' in the simplified beamformer from Equation (11). Likewise, other elements of the least square solution ŝ(t) are equal to the interference orthogonal subspace projection-based beamformer outputs, with the steering vectors used for the beamformer weight calculation respectively corresponding to the individual estimated directions.

As a result, each row of the least square solution $\hat{S} = [\hat{s}(1), \ldots, \hat{s}(T)] \in C^{(K+1) \times T}$ corresponds to the desired beamformer output of each estimated direction (e.g., azimuth angle) in one specific dimension (e.g., azimuth dimension), which then serves as the beam vector in another dimension (e.g., elevation dimension) for the angle estimation (e.g., elevation angle). In this way, the 2D angle estimation required in 4D automotive imaging radar is decoupled into two highly-efficient 1D angle estimations. Compared with calculating K+1 individual beamformer weights and their outputs either in parallel or in sequential, the interference-orthogonal subspace projection-based beamforming approach allows for more computationally-efficient angle estimation.

Figure 5:
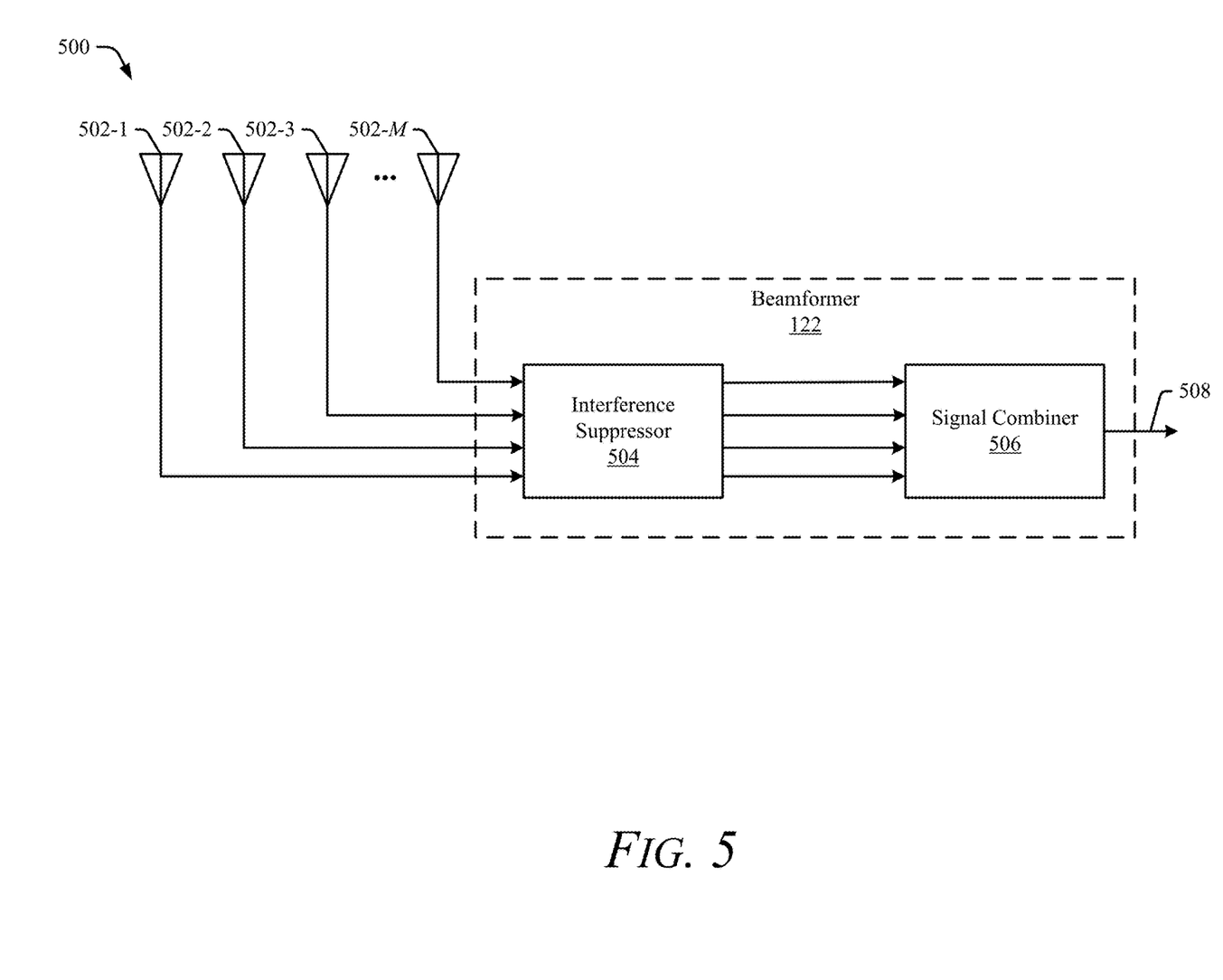
FIG. 5 illustrates an example conceptual diagram of a beamformer in accordance with techniques of this disclosure.

FIG. 5 illustrates an example conceptual diagram 500 of a beamformer in accordance with techniques of this disclosure. The beamformer of FIG. 5 can be the beamformer of FIGS. 1, 3, and 4. As described with respect to FIG. 4, the beamformer 122 determines a desired signal output 508, $s_0(t)$. Inputs to the conceptual diagram 500 include radar return signals 110-2 received at antenna elements 502-1, 502-2, 502-3, and 502-M with M representing the number of antenna elements.

The beamformer 122 can be conceptualized as a combination of an interference suppressor 504 and a signal combiner 506. At the interference suppressor 504, the array observation vector x(t) is projected on the interference-orthogonal subspace projection matrix Pt, which suppresses the interference term $x_i(t) = A_i s_i(t)$ where $s_i(t) = [s_1(t), \ldots, s_K(t)]^T$. At the signal combiner 506, the projected output $\tilde{x}_s(t)$ from the interference suppressor 504 is weighted by the desired signal steering vector $a_0$ to constructively combine the delayed copy of the desired signal from the different array antenna elements to form the desired signal output 508. In other words, the beamformer 122 can be thought of as a cascade of the interference suppressor 504 and the signal combiner 506.

Example Method

Figure 6:
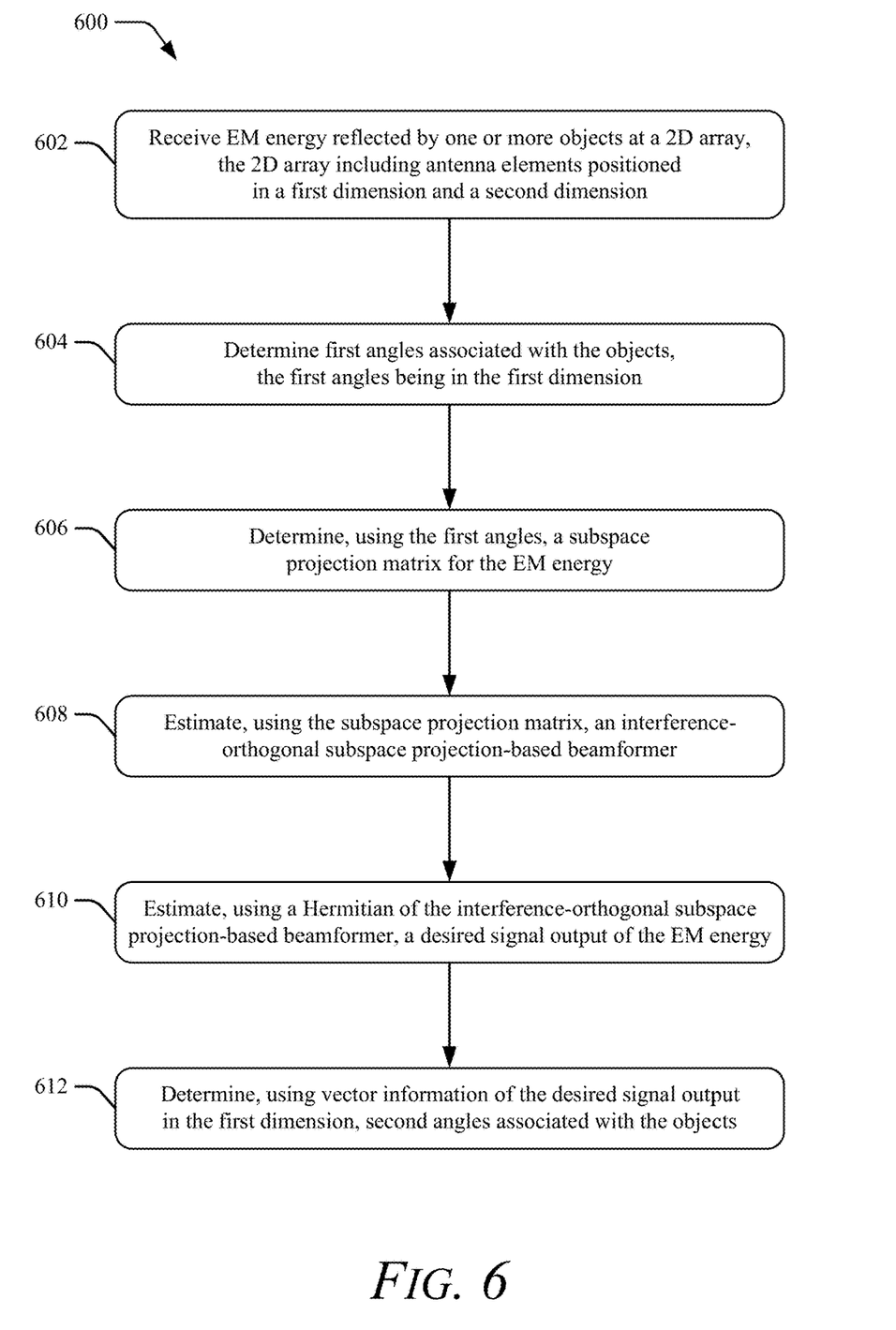
FIG. 6 illustrates an example method of a radar system to perform multiple-target, simultaneous beamforming.

FIG. 6 illustrates an example method 600 of the radar system 104 to perform multiple-target, simultaneous beamforming. Method 600 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 5, reference to which is made for example only. The techniques are not limited to performance by one entity or multiple entities.

At 602, an antenna of a radar system receives EM energy at a 2D array reflected by one or more objects. The 2D array includes at least four antenna elements positioned in a first dimension and a second dimension. For example, the antenna 116 of the radar system 104 installed in the vehicle 102 can receive the EM energy 304 at the 2D array 302 reflected by the one or more objects 106. The 2D array 302 includes multiple antenna elements positioned in the first dimension (e.g., the azimuth direction) and the second dimension (e.g., the elevation direction). The first dimension can be orthogonal or not orthogonal to the second dimension.

The antenna elements of the 2D array 302 in the first dimension can be unaligned with antenna elements of the 2D array 302 in the second dimension. The antenna elements of the 2D array 302 can be uniformly spaced apart by a first distance in the first dimension and a second distance in the second dimension, with the first distance being equal to or different than the second distance.

The antenna 116 can also include a 1D array or a concatenated 1D array. The 1D array and the concatenated 1D array include additional antenna elements not encompassed by the 2D array 302 and positioned in the first dimension. The 1D array and the concatenated 1D array can be uniform linear arrays.

At 604, first angles associated with one or more detections of the one or more objects are determined using the EM energy received at the antenna. The first angles are in the first dimension. For example, the processor 118 of the radar system 104 can determine, using the angle estimator 124 and the EM energy 304 received by the 2D array 302, the first angles 308 associated with detections of the objects 106. In particular, the processor 118 can use the EM energy 304 received at a subset of the antenna elements of the 2D array 302 to determine the first angles 308. The subset of the antenna elements can be positioned in the first dimension.

The processor 118 can also use EM energy received by the 1D array or the concatenated 1D array to determine the first angles 308. The processor 118 can determine the first angles 308 using an ESPRIT, MUSIC, or NLS based function.

At 606, a subspace projection matrix for the EM energy is determined using the first angles. The subspace projection matrix is determined without an estimate of noise power or interference power in the EM energy. For example, the processor 118 can determine the interference-orthogonal subspace projection matrix using the first angles 308. As described above, the interference-orthogonal subspace projection matrix can be determined without estimating the noise power or the power of interference signals in the EM energy 304.

At 608, an interference-orthogonal subspace projection-based beamformer is estimated using the subspace projection matrix. For example, the processor 118 can determine the interference-orthogonal subspace projection-based beamformer using the interference-orthogonal subspace projection matrix as discussed with respect to FIG. 4.

At 610, a desired signal output of the EM energy without the effect of the interference signals is estimated using a Hermitian of the interference-orthogonal subspace projection-based beamformer. For example, the processor 118 can estimate the desired signal output from an adaptive beamformer using a Hermitian of the interference-orthogonal subspace projection-based beamformer as discussed with respect to FIG. 4. Taking advantage of the signal-to-noise ratio being large in automotive radar applications, the interference-orthogonal subspace projection-based beamformer only suppresses the interference.

At 612, second angles associated with the objects are determined using vector information of the desired signal output in the first dimension. The second angles are in the second dimension and corresponding to respective first angles. For example, the processor 118 can determine, using vector information of the desired signal output in the first dimension, second angles associated with the objects 106. The second angles are in the second dimension and one or more second angles correspond with respective first angles 308. The processor 118 can perform operation 612 in simultaneously or sequentially for each second angle. The processor 118 can determine the second angles using a phase compare, FFT, or NLS based function.

EXAMPLES

In the following section, examples are provided.

Example 1. A radar system comprising: an antenna configured to receive electromagnetic (EM) energy reflected by one or more objects, the antenna comprising a two-dimensional (2D) array that includes at least four antenna elements positioned in a first dimension and a second dimension; and one or more processors configured to: determine, using the EM energy received at the antenna, first angles associated with the one or more objects, the first angles being in the first dimension; determine, using the first angles, a subspace projection matrix, the subspace projection matrix being determined without an estimate of a power of noise in the EM energy or a power of interference signals in the EM energy; estimate, using the subspace projection matrix, an interference-orthogonal subspace projection-based beamformer, the interference-orthogonal subspace projection-based beamformer being a function of the subspace projection matrix and a steering vector for the EM energy, the steering vector being a function of the first angles; estimate, using a Hermitian of the interference orthogonal subspace projection-based beamformer, a desired signal output of the EM energy without the interference signals; and determine, using vector information of the desired signal output in the first dimension, second angles associated with the one or more objects, each second angle of the second angles being in the second dimension and corresponding to a respective first angle of the first angles.

Example 2. The radar system of Example 1, wherein each vector of the desired signal output in the first dimension is used to determine one or more respective second angles.

Example 3. The radar system of Example 2, wherein the one or more processors are configured to determine the second angles associated with the one or more objects simultaneously.

Example 4. The radar system of Example 2, wherein the one or more processors are configured to determine the second angles associated with the one or more objects sequentially.

Example 5. The radar system of any one of the preceding examples, wherein: the antenna further comprises an additional one-dimensional (1D) array including additional antenna elements not encompassed by the 2D array and positioned in the first dimension; and the one or more processors are configured to determine the first angles associated with the one or more objects using the EM energy received at the additional 1D array.

Example 6. The radar system of Example 5, wherein the additional 1D array is a uniform linear array.

Example 7. The radar system of Example 5, wherein: the additional antenna elements of the additional 1D array are concatenated with a subset of the antenna elements of the 2D array to form a concatenated 1D array; and the first angles associated with the one or more objects are determined using the EM energy received at the concatenated 1D array.

Example 8. The radar system of any one of the preceding examples, wherein the one or more processors are configured to: determine the first angles using at least one of an Estimation of Signal Parameters via Rotational Invariance Technique (ESPRIT), a Multiple Signal Classification (MUSIC), or a non-linear least squares (NLS) based function; and determine the second angles using at least one of a phase compare, fast Fourier transform (FFT), or NLS based function.

Example 9. The radar system of any one of the preceding examples, wherein the antenna elements of the 2D array in the first dimension are not aligned with antenna elements of the 2D array in the second dimension.

Example 10. The radar system of any one of the preceding examples, wherein the one or more processors are configured to determine the first angles associated with the one or more objects using the EM energy received at a subset of the antenna elements of the 2D array, the subset of the antenna elements positioned in the first dimension.

Example 11. The radar system of any one of the preceding examples, wherein the antenna elements of the 2D array are uniformly spaced apart by a first distance in the first dimension and a second distance in the second dimension, the first distance being different than the second distance.

Example 12. The radar system of any one of the preceding examples, wherein the second dimension is not orthogonal to the first dimension.

Example 13. The radar system of any one of the preceding examples, wherein the radar system is configured to be installed on an automobile.

Example 14. A computer-readable storage media comprising computer-executable instructions that, when executed, cause a processor of a radar system to: receive, by an antenna of the radar system, electromagnetic (EM) energy reflected by one or more objects; determine, using the EM energy received by a two-dimensional (2D) array of the antenna, first angles associated with the one or more objects, the 2D array comprising at least four antenna elements positioned in a first dimension and a second dimension, the first angles being in the first dimension; determine, using the first angles, a subspace projection matrix, the subspace projection matrix being determined without an estimate of a power of noise in the EM energy or a power of interference signals in the EM energy; estimate, using the subspace projection matrix, an interference-orthogonal subspace projection-based beamformer, the interference-orthogonal subspace projection-based beamformer being a function of the subspace projection matrix and a steering vector for the EM energy, the steering vector being a function of the first angles; estimate, using a Hermitian of the interference orthogonal subspace projection-based beamformer, a desired signal output of the EM energy without the interference signals; and determine, using vector information of the desired signal output in the first dimension, second angles associated with the one or more objects, each second angle of the second angles being in the second dimension and corresponding to a respective first angle of the first angles.

Example 15. A method comprising: receiving, by an antenna of a radar system, electromagnetic (EM) energy reflected by one or more objects; determining, using the EM energy received by a two-dimensional (2D) array of the antenna, first angles associated with the one or more objects, the 2D array comprising at least four antenna elements positioned in a first dimension and a second dimension, the first angles being in the first dimension; determining, using the first angles, a subspace projection matrix, the subspace projection matrix being determined without an estimate of a power of noise in the EM energy or a power of interference signals in the EM energy; estimating, using the subspace projection matrix, an interference-orthogonal subspace projection-based beamformer, the interference-orthogonal subspace projection-based beamformer being a function of the subspace projection matrix and a steering vector for the EM energy, the steering vector being a function of the first angles; estimating, using a Hermitian of the interference-orthogonal subspace projection-based beamformer, a desired signal output of the EM energy without the interference signals; and determining, using vector information of the desired signal output in the first dimension, second angles associated with the one or more objects, each second angle of the second angles being in the second dimension and corresponding to a respective first angle of the first angles.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A radar system comprising:
    an antenna configured to receive electromagnetic (EM) energy reflected by one or more objects, the antenna comprising a two-dimensional (2D) array that includes at least four antenna elements positioned in a first dimension and a second dimension and an additional one-dimensional (1D) concatenated array, including additional antenna elements not encompassed by the 2D array, and positioned in the first dimension; and
    one or more processors configured to:
        determine, using the EM energy received at the additional 1D concatenated array, first angles associated with the one or more objects, the first angles being in the first dimension;
        determine, using the first angles, an interference-orthogonal subspace projection matrix, the interference-orthogonal subspace projection matrix being determined without an estimate of a power of noise in the EM energy or a power of interference signals in the EM energy;
        estimate, using the interference-orthogonal subspace projection matrix, an interference-orthogonal subspace projection-based beamformer, the interference-orthogonal subspace projection-based beamformer being a function of the interference-orthogonal subspace projection matrix and a steering vector for the EM energy, the steering vector being a function of the first angles;
        estimate, using a Hermitian of the interference orthogonal subspace projection-based beamformer, a desired signal output of the EM energy without the interference signals; and
        determine, using vector information of the desired signal output in the first dimension, second angles associated with the one or more objects, each second angle of the second angles being in the second dimension and corresponding to a respective first angle of the first angles.

2. The radar system of claim 1, wherein each vector of the desired signal output in the first dimension is used to determine one or more respective second angles.

3. The radar system of claim 2, wherein the one or more processors are configured to determine the second angles associated with the one or more objects simultaneously.

4. The radar system of claim 2, wherein the one or more processors are configured to determine the second angles associated with the one or more objects sequentially.

5. The radar system of claim 1, wherein the additional 1D array is a uniform linear array.

6. The radar system of claim 1, wherein the one or more processors are configured to:
    determine the first angles using at least one of an Estimation of Signal Parameters via Rotational Invariance Technique (ESPRIT), a Multiple Signal Classification (MUSIC), or a non-linear least squares (NLS) based function; and
    determine the second angles using at least one of a phase compare, fast Fourier transform (FFT), or NLS based function.

7. The radar system of claim 1, wherein the antenna elements of the 2D array in the first dimension are not aligned with antenna elements of the 2D array in the second dimension.

8. The radar system of claim 1, wherein the one or more processors are configured to determine the first angles associated with the one or more objects using the EM energy received at a subset of the antenna elements of the 2D array, the subset of the antenna elements positioned in the first dimension.

9. The radar system of claim 1, wherein the antenna elements of the 2D array are uniformly spaced apart by a first distance in the first dimension and a second distance in the second dimension, the first distance being different than the second distance.

10. The radar system of claim 1, wherein the second dimension is not orthogonal to the first dimension.

11. The radar system of claim 1, wherein the radar system is configured to be installed on an automobile.

12. At least one non-transitory computer-readable storage medium comprising computer-executable instructions that, when executed, cause a processor of a radar system to:
    receive, by an antenna of the radar system, electromagnetic (EM) energy reflected by one or more objects, the antenna comprising a two-dimensional (2D) array that includes at least four antenna elements positioned in a first dimension and a second dimension and an additional one-dimensional (1D) concatenated array, including additional antenna elements not encompassed by the 2D array, and positioned in the first dimension;

determine, using the EM energy received at the additional 1D concatenated array, first angles associated with the one or more objects, the first angles being in the first dimension;

determine, using the first angles, an interference-orthogonal subspace projection matrix, the interference-orthogonal subspace projection matrix being determined without an estimate of a power of noise in the EM energy or a power of interference signals in the EM energy;

estimate, using the interference-orthogonal subspace projection matrix, an interference-orthogonal subspace projection-based beamformer, the interference-orthogonal subspace projection-based beamformer being a function of the interference-orthogonal subspace projection matrix and a steering vector for the EM energy, the steering vector being a function of the first angles;

estimate, using a Hermitian of the interference orthogonal subspace projection-based beamformer, a desired signal output of the EM energy without the interference signals; and determine, using vector information of the desired signal output in the first dimension, second angles associated with the one or more objects, each second angle of the second angles being in the second dimension and corresponding to a respective first angle of the first angles.

13. The at least one non-transitory computer-readable storage medium of claim 12, wherein each vector of the desired signal output in the first dimension is used to determine one or more respective second angles.

14. The at least one non-transitory computer-readable storage medium of claim 13, wherein the at least one non-transitory computer-readable storage medium comprises further computer-executable instructions that, when executed, cause the processor of the radar system to determine the second angles associated with the one or more objects simultaneously.

15. The at least one non-transitory computer-readable storage medium of claim 12, wherein the at least one non-transitory computer-readable storage medium comprises further computer-executable instructions that, when executed, cause the processor of the radar system to:
determine the first angles using at least one of an Estimation of Signal Parameters via Rotational Invariance Technique (ESPRIT), a Multiple Signal Classification (MUSIC), or a non-linear least squares (NLS) based function; and
determine the second angles using at least one of a phase compare, fast Fourier transform (FFT), or NLS based function.

16. The at least one non-transitory computer-readable storage medium of claim 12, wherein the at least one non-transitory computer-readable storage medium comprises further computer-executable instructions that, when executed, cause the processor of the radar system to determine the first angles associated with the one or more objects using the EM energy received at a subset of the antenna elements of the 2D array, the subset of the antenna elements positioned in the first dimension.

17. The at least one non-transitory computer-readable storage medium of claim 12, wherein the radar system is configured to be installed on an automobile.

18. A method comprising:
receiving, by an antenna of a radar system, electromagnetic (EM) energy reflected by one or more objects, the antenna comprising a two-dimensional (2D) array that includes at least four antenna elements positioned in a first dimension and a second dimension and an additional one-dimensional (1D) concatenated array, including additional antenna elements not encompassed by the 2D array, and positioned in the first dimension;

determining, using the EM energy received at the additional 1D concatenated array, first angles associated with the one or more objects, the first angles being in the first dimension;

determining, using the first angles, an interference-orthogonal subspace projection matrix, the interference-orthogonal subspace projection matrix being determined without an estimate of a power of noise in the EM energy or a power of interference signals in the EM energy;

estimating, using the interference-orthogonal subspace projection matrix, an interference-orthogonal subspace projection-based beamformer, the interference-orthogonal subspace projection-based beamformer being a function of the interference-orthogonal subspace projection matrix and a steering vector for the EM energy, the steering vector being a function of the first angles;

estimating, using a Hermitian of the interference-orthogonal subspace projection-based beamformer, a desired signal output of the EM energy without the interference signals; and determining, using vector information of the desired signal output in the first dimension, second angles associated with the one or more objects, each second angle of the second angles being in the second dimension and corresponding to a respective first angle of the first angles.

* * * * *